US006799129B2

(12) United States Patent
Schmidt et al.

(10) Patent No.: US 6,799,129 B2
(45) Date of Patent: Sep. 28, 2004

(54) METHOD AND SYSTEM FOR MONITORING TIRE PRESSURE IN VEHICLES EQUIPPED WITH ANTI-LOCK BRAKING SYSTEMS

(75) Inventors: Detlef Schmidt, Gehrden (DE); André Bork, Hannover (DE); Klaus Pape, Hannover (DE); Gerhard Ruhnau, Neustadt (DE); Thomas Dieckmann, Pattensen (DE)

(73) Assignee: WABCO GmbH & Co. OHG, Hannover (DE)

( * ) Notice: Subject to any disclaimer, the term of this patent is extended or adjusted under 35 U.S.C. 154(b) by 11 days.

(21) Appl. No.: 10/084,541

(22) Filed: Feb. 26, 2002

(65) Prior Publication Data

US 2002/0157461 A1 Oct. 31, 2002

(30) Foreign Application Priority Data

Feb. 28, 2001 (DE) .......... 101 09 725
Oct. 24, 2001 (DE) .......... 101 52 590

(51) Int. Cl.$^7$ .......... G01R 13/00; G01L 11/00; B60C 23/02
(52) U.S. Cl. .......... 702/73; 702/138; 73/146.2; 340/442
(58) Field of Search .......... 702/73, 83, 138; 73/146, 146.2; 340/442, 443, 444; 701/29

(56) References Cited

U.S. PATENT DOCUMENTS

| 5,206,643 A | * | 4/1993 | Eckelt .......... 340/932.2 |
| 5,345,217 A | | 9/1994 | Prottey |
| 5,591,906 A | * | 1/1997 | Okawa et al. .......... 73/146.5 |
| 5,721,528 A | * | 2/1998 | Boesch et al. .......... 340/442 |
| 5,929,756 A | * | 7/1999 | Randazzo et al. .......... 340/444 |
| 6,092,415 A | | 7/2000 | Borenius et al. |
| 6,169,480 B1 | | 1/2001 | Uhl et al. |
| 6,476,712 B1 | * | 11/2002 | Achterholt .......... 340/447 |
| 6,529,807 B2 | * | 3/2003 | Sugisawa .......... 701/29 |
| 6,594,566 B1 | * | 7/2003 | Skoff .......... 701/36 |

FOREIGN PATENT DOCUMENTS

| DE | 197 34 323 A1 | 2/1999 |
| DE | 198 07 880 A1 | 9/1999 |
| DE | 199-39-936 A1 | 3/2001 |
| DE | 100-44-114 A1 | 8/2001 |

(List continued on next page.)

OTHER PUBLICATIONS

Williams, Roger, "DWS—ein neues Druckverlust–Warnsystem für Automobilreifen," ATZ—Automobiltechnische Zeitschrift 94, 1992, 6, pp. 336–340.

Normann, Norbert, "Reifendruck–Kontrollsystem Für alle Fahrzeugklassen," ATZ—Automobiltechniesche Zeitschrift, 102, 2000, 11, pp. 950–956.

*Primary Examiner*—John Barlow
*Assistant Examiner*—Meagan S Walling
(74) *Attorney, Agent, or Firm*—Kramer Levin Naftalis & Frankel LLP

(57) ABSTRACT

A tire pressure monitoring system and method for vehicles equipped with anti-lock breaking systems (ABS), especially vehicles with more than two axles, is provided. Wheel sensors associated with the ABS are utilized to sense variables which depend on wheel rotation, such as speed of rotation of the wheels or travel distances covered by the wheels. An ABS control unit logically combines the determined variables with one another and performs an evaluation with respect to change of rolling radii of the wheels while allowing for changes of the variable caused by driving operation. The ABS control unit generates a warning signal when the change of variables caused by tire pressure decrease exceeds a preselected limit value. In addition to the wheel sensors, a tire pressure measuring system which measures the absolute tire inflation pressure of the wheels of at least one axle and generates a warning signal when the measured tire inflation pressure drops below a preselected setpoint pressure can be utilized.

26 Claims, 11 Drawing Sheets

FOREIGN PATENT DOCUMENTS

| | | |
|---|---|---|
| EP | 0 512 745 A1 | 11/1992 |
| EP | 0 489 562 B1 | 6/1994 |
| EP | 0 489 563 B1 | 6/1994 |
| EP | 0 607 695 A1 | 7/1994 |
| EP | 0 607 690 B1 | 2/1997 |
| JP | 06092115 A | 4/1994 |
| WO | WO 00 69 662 A1 | 11/2000 |
| WO | WO 01 10 658 A1 | 2/2001 |

* cited by examiner

METHOD AND SYSTEM FOR MONITORING TIRE PRESSURE IN VEHICLES EQUIPPED WITH ANTI-LOCK BRAKING SYSTEMS

BACKGROUND OF THE INVENTION

The present invention is directed to a method and system for monitoring tire pressure in a vehicle equipped with an anti-lock braking system (ABS) based on the deviation of tire pressure of at least one tire from a reference value.

Safety and reliability are central aspects of automotive engineering. Tire pressure is an important aspect in this regard. Loss of tire pressure has been recognized to be a significant factor in road traffic accidents. 85% of tire failures are a consequence of a creeping pressure loss. Incidentally, correctly adjusted tire pressure ensures optimal driving comfort at all times in terms of rolling noise, vertical bumpiness and sensitivity to transverse expansion joints.

It is known that tire pressure can be monitored directly by means of pressure sensors on two-axle or three-axle vehicles (see ATZ Automobiltechnische Zeitschrift 102 (2000) 11, pp. 950 ff.). The pressure sensors are mounted on the tire and rotate with the wheel. The pressure sensors are equipped with a high-frequency transmitter (HF transmitter) which transmits the measured pressure values to a receiver disposed in the motor vehicle and signals pressure losses to the driver. This functions both during travel and when the vehicle is stationary. Since this approach is based purely on measurement, the costs are relatively high, especially if all wheels are being monitored.

It is also known that tire pressure can be monitored indirectly by means of ABS wheel sensors (see ATZ Automobiltechnische Zeitschrift 94 (1992) 6, pp. 336–340; EP 0 489 562 B1; EP 0 489 563 B1 and EP 0 607 690 B1). Tire pressure also affects the rolling circumference of the tires. The speed of rotation of the wheels determined by means of the wheel sensors of the ABS depends on the rolling circumference of the wheels. If, during travel in a straight line without braking, the speed of rotation of a wheel changes relative to the reference speed of the other wheels or of one other wheel, this represents an indicator of a change in rolling circumference of the wheel in question as a result of pressure loss from the tire or of separation of pieces of tire at the tire circumference or of a variation in loading. Any change of rolling circumference is interpreted as a pressure change.

The known methods of monitoring tire pressure are imprecise and are capable of detecting only large and suddenly occurring pressure changes.

Accordingly, it is desired to provide a method and system for monitoring tire pressure that permit detection of small and creeping tire pressure losses.

SUMMARY OF THE INVENTION

Generally speaking, in accordance with the present invention, a method and system for monitoring vehicle tire pressure are provided which overcome disadvantages associated with prior art methods and systems.

The tire pressure monitoring system and method according to the present invention are provided for vehicles equipped with anti-lock braking systems, especially vehicles having more than two axles. ABS wheel sensors on the wheels of at least one axle sense variables which depend on wheel rotation such as the travel distances covered by the wheels or the speeds of rotation of the wheels. An ABS control unit adds the variables of the individual wheels on the respective diagonals relative to the wheel arrangement of the vehicle. Recognition of an undesired (insufficient) tire pressure condition takes place when the diagonal sums differ from one another by more than a preselected limit value. Furthermore, monitoring of the variables takes place in a plurality of monitoring cycles, recognition of an undesired tire pressure condition taking place when the deviations of the diagonal sums exceed a summation limit value defined for all monitoring cycles. Thus, it is possible to achieve improved accuracy and sensitivity in the recognition of undesired tire pressure conditions.

An embodiment of the present invention utilizes a combination of direct tire pressure measurement by means of pressure sensors of a tire pressure measuring system and indirect tire pressure determination using the wheel sensors. It is therefore possible to substitute pressure sensors of the tire pressure measuring system by ABS wheel sensors and/or to use the ABS control device for evaluation of the measured signals of the tire pressure measuring system as well, whereby components and costs can be saved without impairing the reliability and safety of tire pressure monitoring. The actual tire pressures determined by means of pressure sensors support the values determined indirectly by means of the ABS.

Accordingly, it is an object of the present invention to provide a method and system for monitoring tire pressure in vehicles, including vehicles equipped with ABS.

It is also an object of the present invention to provide a method and system for tire pressure monitoring that are cost-effective and that react more sensitively to small and creeping pressure losses.

It is another object of the present invention to provide a method and system for tire pressure monitoring which provide for both direct and indirect pressure determination.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
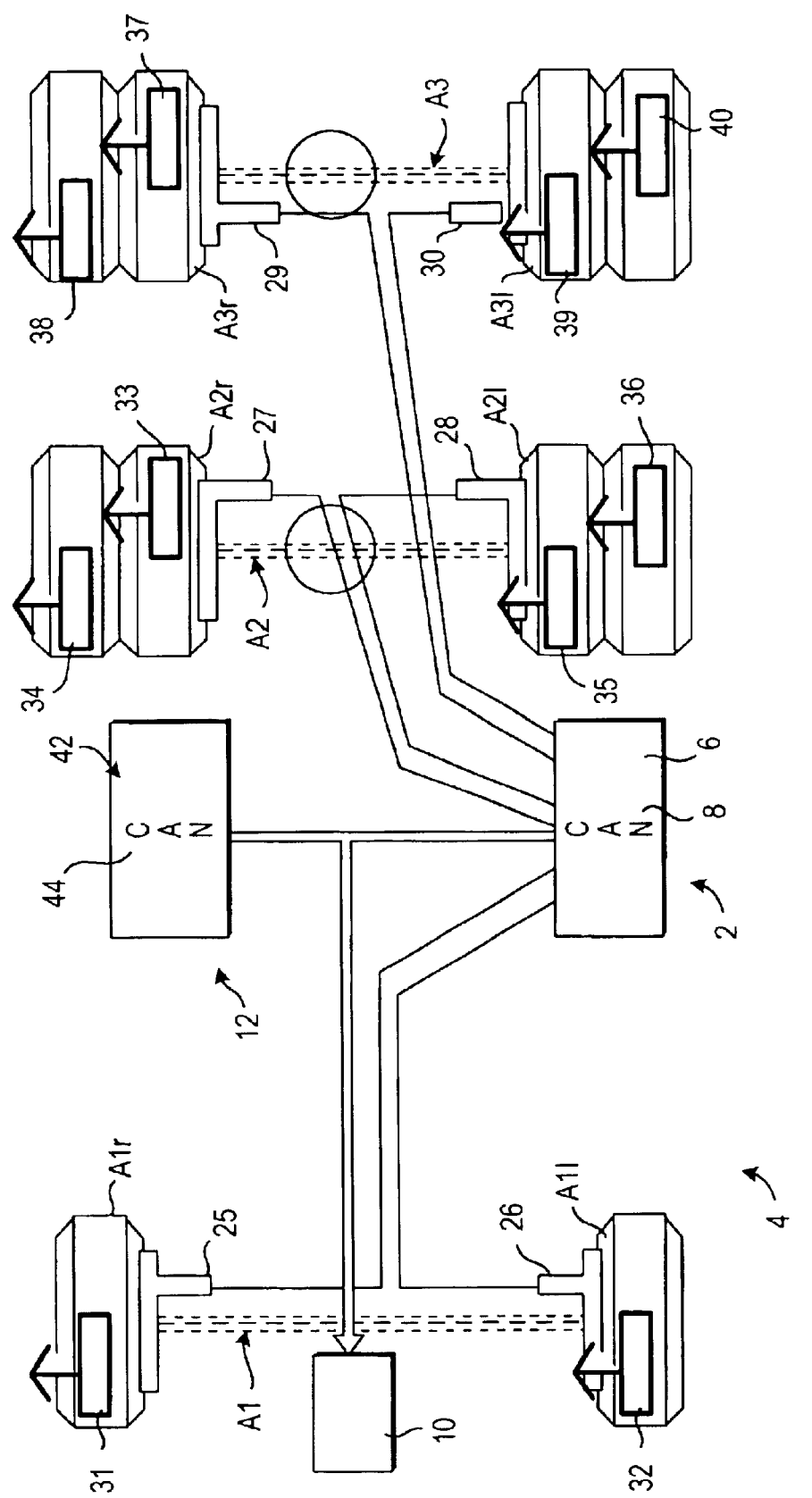
FIGS. 1–9 are schematics depicting various embodiments of the tire pressure monitoring system according to the present invention applied to three-axle vehicles.

Referring to the drawing figures where like reference numerals are used for corresponding elements, FIGS. 1 to 9 schematically show three-axle vehicles 4 equipped with anti-lock braking systems (ABS) 2 and tire pressure measuring systems 12. The ABS and tire pressure measuring systems are combined to yield a tire pressure monitoring system. Although the following detailed description refers to three-axle vehicles, it should be understood that the present invention also has application for vehicles with (2+n) axles, where n≧0, or, in other words, vehicles with two or more axles.

Three-axle vehicles 4 are each provided with a front axle A1, which is provided with a right front wheel A1r and a left front wheel A1l, a driving axle A2, which is provided with right dual wheels A2r and left dual wheels A2l, and a third axle A3, which is provided with right dual wheels A3r and left dual wheels A3l. It should be appreciated that single tires can also be used instead of dual tires.

ABS 2 preferably comprises an ABS control unit 6 and a Controller Area Network (CAN) interface 8. Wheel sensors and brake pressure modulators (shown in the drawings as blocks 25, 26, 27, 28, 29, 30) are allocated to the wheels of at least one of the three axles A1, A2, A3. ABS control unit 6 determines the speed of rotation of the wheels or the travel distance covered from the signals of the wheel sensors. A change in rolling radius due to tire pressure loss is recognized by increasing speed of rotation of the wheel or decreasing travel distance and is desirably indicated to the driver on a display 10. Influences on the rolling radius and thus on the speed of rotation of the wheels or on the travel distance covered due to special situations such as cornering, acceleration, deceleration, high speed, wheel load (loading) and abrasion can be compensated for by suitable comparisons of the speeds of rotation of the wheels or travel distances per axle, per side and/or per diagonal and/or by comparisons with threshold values.

For each wheel of at least one of the three axles, tire pressure measuring system 12 is provided with a wheel electronics package 31, 32, 33, 34, 35, 36, 37, 38, 39, 40 which is desirably disposed in or on the tire and comprises a sensor, a signal-processing stage, an HF transmitter stage and a battery as the power source. It should be understood that a power source other than a battery may be used such as, for example, an external power supply by means of transponder technology.

Each wheel electronics package forms with its respective tire inflation valve a unit that is desirably mounted on the rim of the wheel. The sensor is provided with a pressure sensor which measures the pressure in the tire and a device for measured-value acquisition and signal conditioning. The sensor controls a digital module in which there is integrated the HF transmitter stage that transmits the measured data to a receiver/evaluation unit 42, desirably with CAN interface 44, in the 433 MHz range, for example. Each wheel electronics package preferably has its own identifier, which is also transmitted.

The respective adjusted tire pressure is initialized by the driver, or the system refers back to setpoint pressures input for the vehicle types in question, in which case the system checks the adjusted pressures for plausibility. A wheel change or replacement is recognized by the system in terms of position on the vehicle. Any decrease in tire pressure—both while the vehicle is stationary or in motion—is desirably displayed to the driver on display 10 by receiver/evaluation unit 42.

FIG. 1 shows an embodiment of a tire pressure monitoring system according to the present invention that uses a 6-channel ABS 2, which is provided with wheel sensors and brake pressure modulators 25, 26, 27, 28, 29, 30 on all three axles, and a tire pressure measuring system 12 with ten wheel electronics packages 31, 32, 33, 34, 35, 36, 37, 38, 39, 40, each wheel of each axle being provided with a wheel electronics package. The ABS for indirect determination of the tire pressures and the tire pressure measuring system can operate in parallel and independently.

Figure 2:
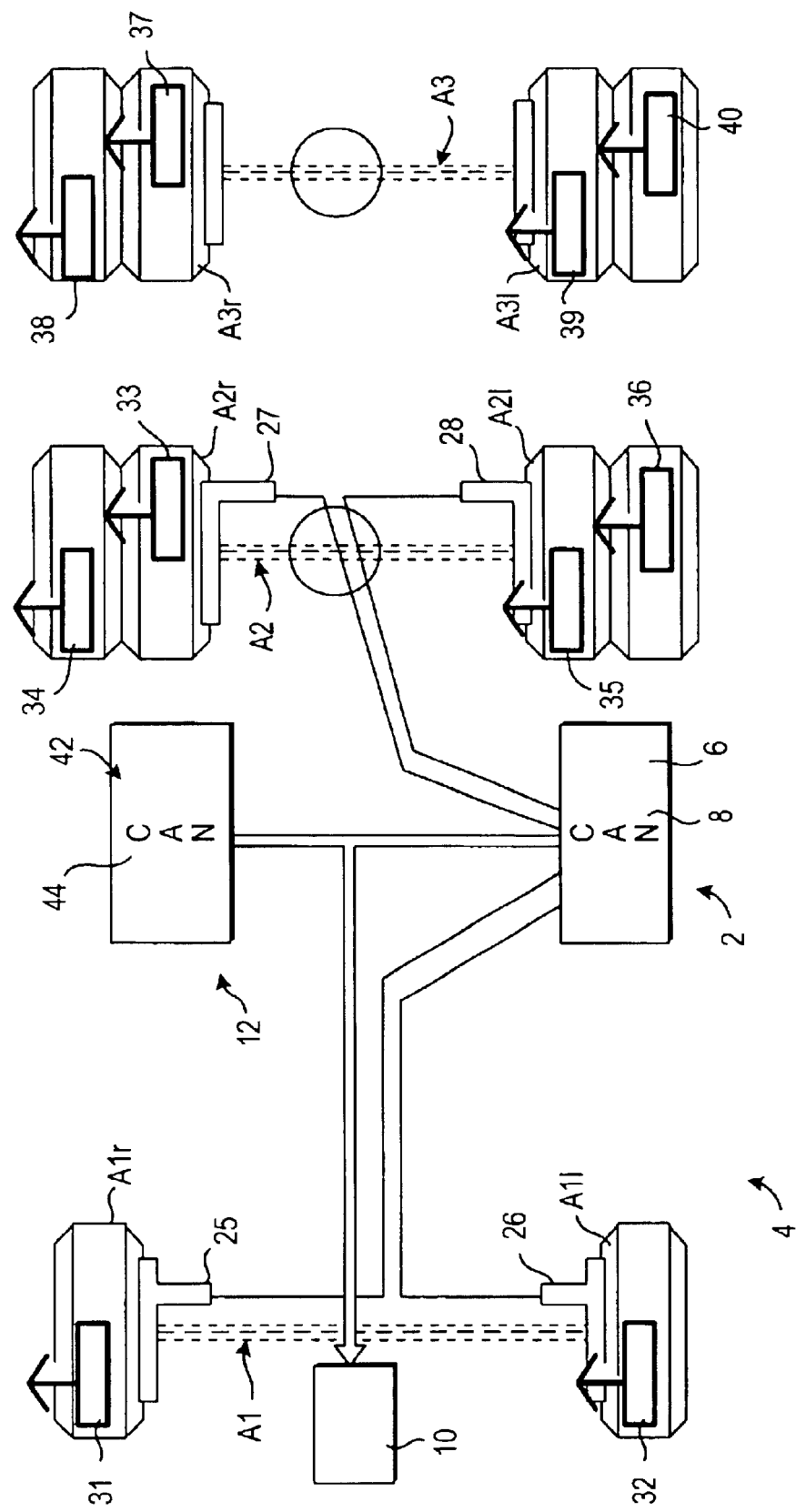

FIG. 2 shows an embodiment of a tire pressure monitoring system according to the present invention that uses a 4-channel ABS. The system shown in FIG. 2 differs from the system shown in FIG. 1 in that only four sensors and four brake pressure modulators 25, 26, 27, 28 are provided for the first and second axles A1 and A2 and the third axle is not monitored for ABS control but is indirectly regulated. Direct pressure measurement by tire pressure measuring system 12 takes place as in the system shown in FIG. 1 on all wheels of all axles. In the embodiment shown in FIG. 2, two ABS wheel sensors and two ABS pole wheels are saved.

Figure 3:
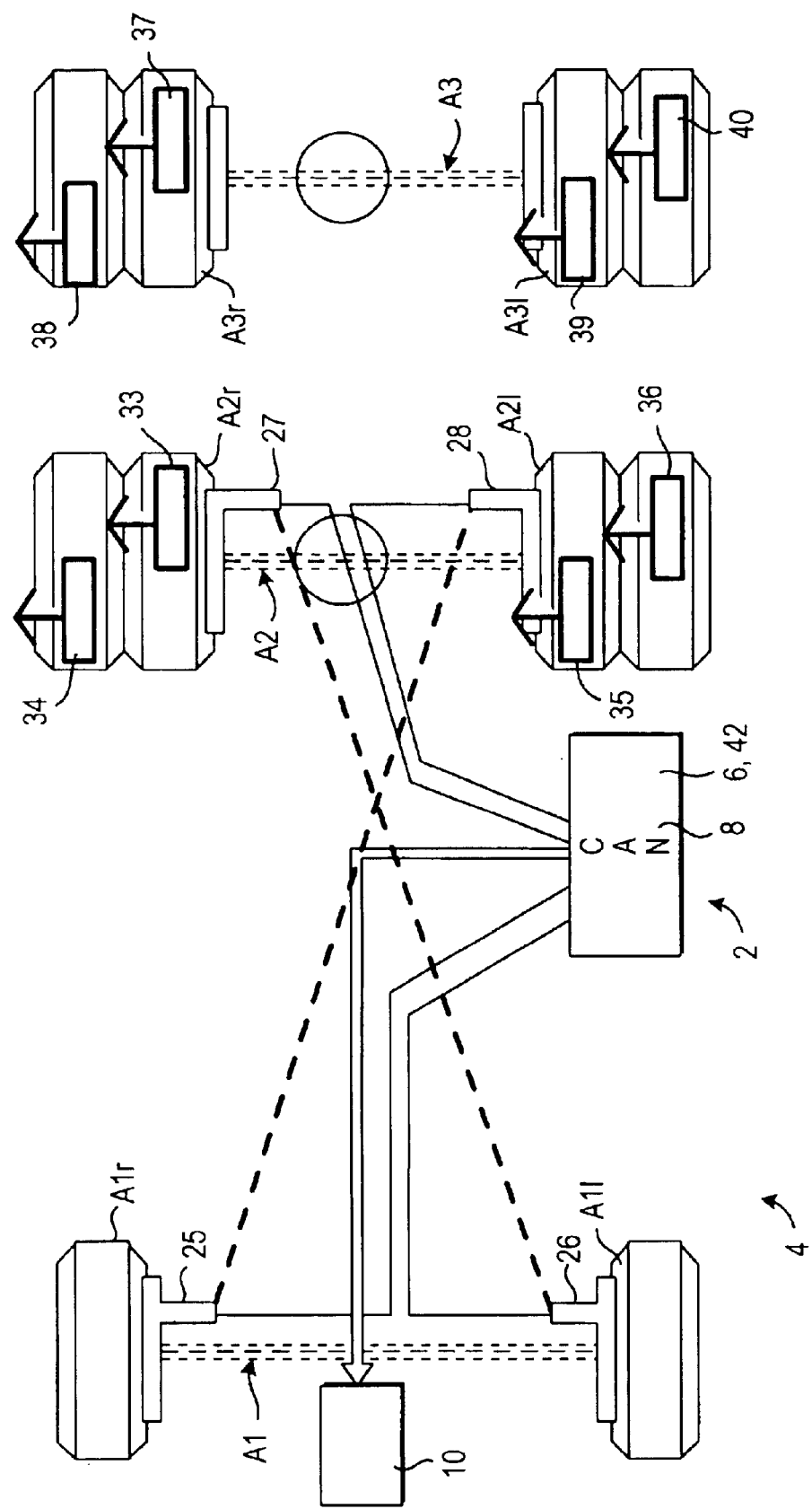

FIG. 3 shows an embodiment of a tire pressure monitoring system according to the present invention in which the ABS used for tire pressure monitoring is provided, as in FIG. 2, with four sensors and four brake pressure modulators 25, 26, 27, 28, specifically on the first and second axles A1 and A2. However, in contrast to the embodiments shown in FIGS. 1 and 2, wheel electronics packages 33, 34, 35, 36, 37, 38, 39, 40 of tire pressure measuring system 12 are provided for only the dual wheels of second and third axles A2 and A3. No wheel electronics packages are provided on the wheels of front axle A1. Furthermore, in contrast to the embodiments depicted in FIGS. 1 and 2, receiver/evaluation unit 42 of tire pressure measuring system 12 is integrated in the housing of the ABS control unit, the ABS computer also performing the evaluation of the measured signals of the wheel electronics packages. In this way, savings are achieved as regards wheel sensors and toothed-pole wheels on the third axle and wheel electronics packages on the first axle and also as regards the separate evaluation device and CAN interface as well as the separate housing of the tire pressure measuring system in the embodiments shown in FIGS. 1 and 2.

In the embodiment depicted in FIG. 3, a diagonal comparison is made of the sum of the speeds of rotation of the wheels or travel distances of right front wheel A1r and of the left wheel of second axle A2l with the sum of the speeds of rotation of the wheels or travel distances of left front wheel A1l and of the right wheel of second axle A2r. In the event of a decrease in tire pressure, the speed of the wheel in question will be increased compared with that of the other wheels, or the travel distance covered will be correspondingly shorter. In the case of speed comparison, for example, positive values signify reduced pressure in right front wheel A1r or in left wheel A2l of the second axle; negative values signify reduced pressure in left front wheel A1l or in right wheel A2r of the second axle. The diagonal comparison via speed of rotation of the wheels or travel distance of the wheels of the first and second axles replaces the pressure sensors on the first axle.

Because of the diagonal comparison, cornering influences are well compensated for. The absolute tire pressures determined via the tire pressure sensors support the results from the diagonal comparison.

Figure 4:
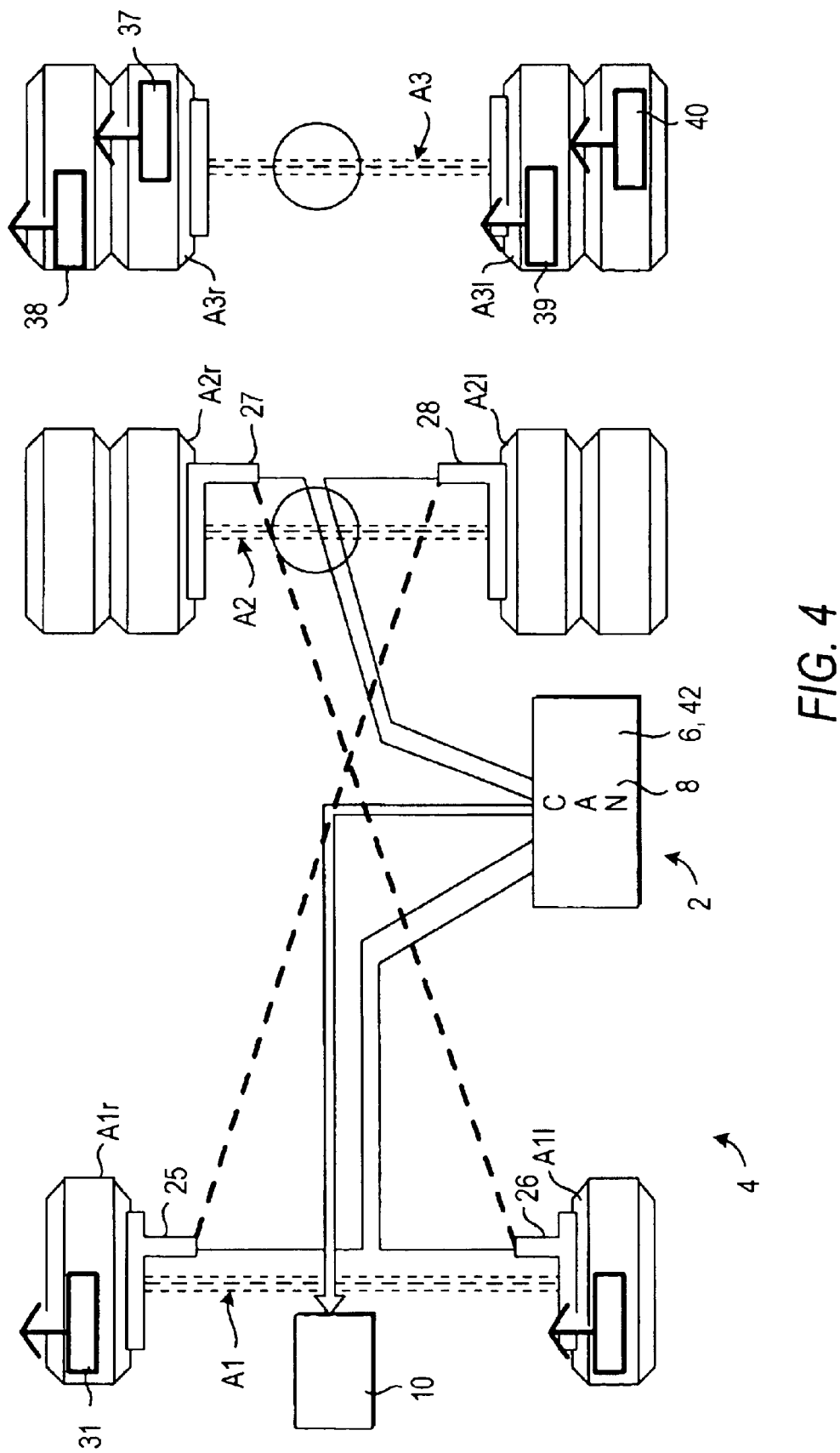

FIG. 4 shows an embodiment of the tire pressure monitoring system according to the present invention which differs from the system shown in FIG. 3 in that wheel electronics packages 31, 32 are provided on wheels A1r and A1l of the first axle instead of on the wheels of second axle A2. The advantage compared with the embodiment according to FIG. 3 resides in the fact that the loaded/empty ratio on the first axle, which is the front axle, is smaller than that on the second axle, and so changes in rolling radius due to loading changes are not as perceptible on the first axle as they are on the second axle or even on the third axle.

Figure 5:
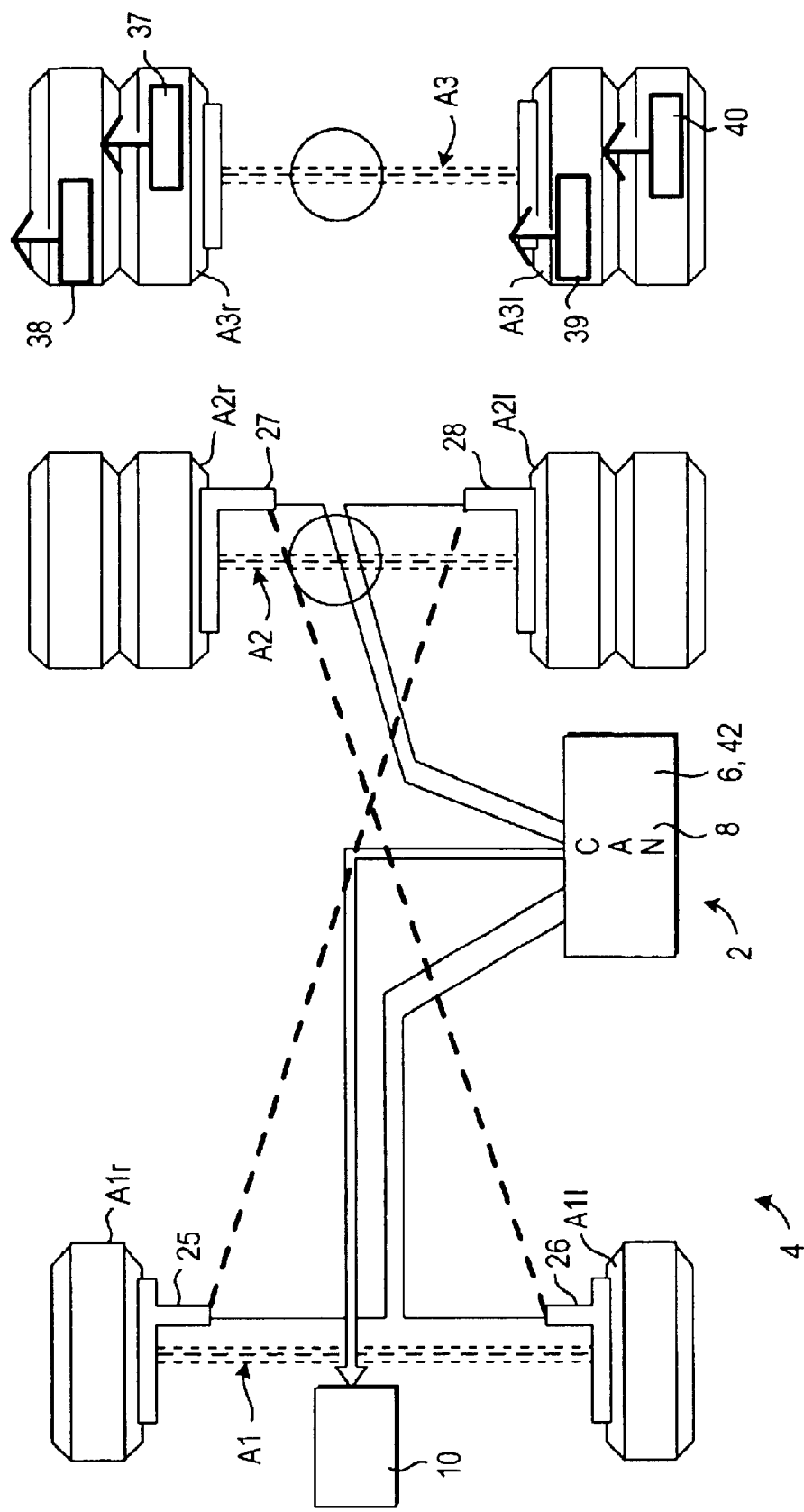

FIG. 5 shows an embodiment of the present invention which differs from the embodiments shown in FIGS. 3 and 4 in that the direct pressure measurement is now performed on only the dual tires of third axle A3. Support for the indirect pressure determination via the diagonal comparison of the wheels of the first and second axles by the direct pressure measurement on the third axle can be achieved by virtue of the proximity of the second and third axles to one another. Because of this proximity, it can be assumed in the error-free case that the rates of rotation of the wheels or the speeds of rotation of the wheels on the second and third axles are substantially identical and thus the speed values of the second axle can be transposed to the third axle.

Figure 6:
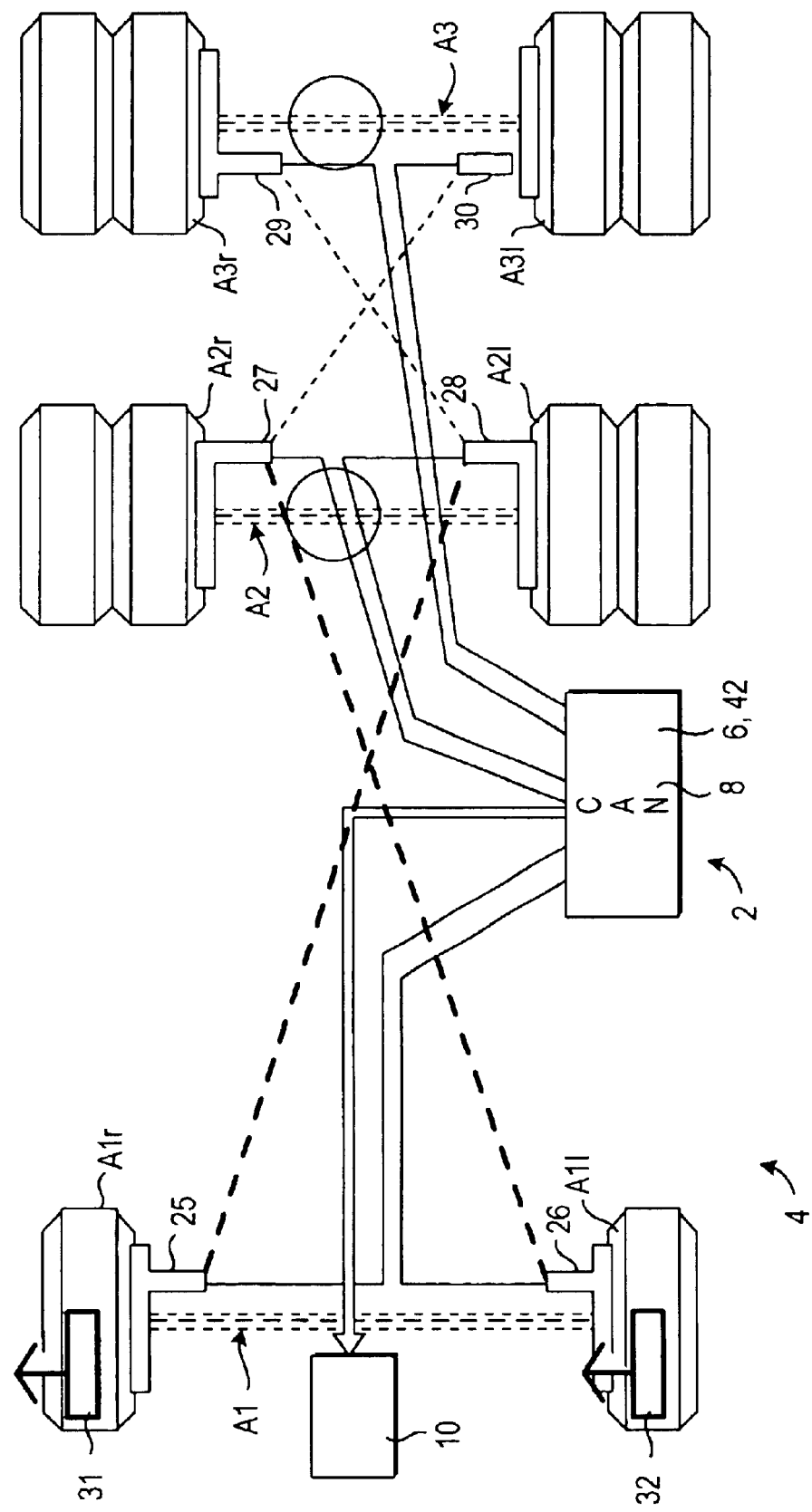

FIG. 6 shows an embodiment of the tire pressure monitoring system according to the present invention in which wheel sensors 25, 26, 27, 28, 29, 30 of ABS 2 are provided on the wheels of all three axles A1, A2, A3. To save costs, direct measurement of tire pressures via wheel electronics packages 31, 32 is provided on only first axle A1, which is the front axle or steering axle. In contrast to the embodiments of the invention depicted in FIGS. 1 and 2, it is not individual wheels but diagonal sums of the wheel speed signals or travel distances of all sensed axles that are compared with one another. Thus, cornering influences are well compensated for.

The following diagonal differences are formed in the speed comparison, where v denotes speed:

Diagonal difference 1: $(V_{A1r} + V_{A2l}) - (V_{A1l} + V_{A2r})$
Diagonal difference 2: $(V_{A2r} + V_{A3l}) - (V_{A2l} + V_{A3r})$
Diagonal difference 3: $(V_{A1r} + V_{A3l}) - (V_{A1l} + V_{A3r})$
Evaluation of the formation of diagonal differences yields the following results:

| Diagonal difference 1 | Diagonal difference 2 | Diagonal difference 3 | Reduced pressure |
|---|---|---|---|
| positive | 0 | positive | A1r |
| negative | 0 | negative | A1l |
| negative | positive | 0 | A2r |
| positive | negative | 0 | A2l |
| 0 | negative | negative | A3r |
| 0 | positive | positive | A3l |

These comparisons of diagonal sums therefore create the capability of achieving reduced pressure indications specific to each wheel.

As an example, the aforesaid formation of diagonal differences is also presented below for a four-axle vehicle, in a configuration in which only three diagonal differences are formed:

Diagonal difference 1: $(V_{A1r} + V_{A2l}) - (V_{A1l} + V_{A2r})$
Diagonal difference 2: $(V_{A3r} + V_{A4l}) - (V_{A3l} + V_{A4r})$
Diagonal difference 3: $(V_{A1r} + V_{A4l}) - (V_{A1l} + V_{A4r})$

| Diagonal difference 1 | Diagonal difference 2 | Diagonal difference 3 | Reduced pressure |
|---|---|---|---|
| positive | 0 | positive | A1r |
| negative | 0 | negative | A1l |
| negative | 0 | 0 | A2r |
| positive | 0 | 0 | A2l |
| 0 | negative | 0 | A3r |
| 0 | positive | 0 | A3l |
| 0 | negative | negative | A4r |
| 0 | positive | positive | A4l |

In principle, each formation of differences in which at least one axle of one diagonal difference is also included in the calculation of another diagonal difference leads to an unequivocal correlation with a specific wheel. For a vehicle with five or more axles, therefore, a fourth diagonal difference is required.

The absolute tire pressures measured by means of wheel electronics packages 31, 32 on the first axle support the comparison of diagonal sums.

The embodiment of the present invention depicted in FIG. 6 has special advantages for the use of external tire pressure sensors that can be left on the vehicle in the event of replacement of complete wheels. This obviates the need to input the wheel identifier of the pressure sensor into the electronics via a suitable diagnostic instrument whenever a wheel is replaced. Moreover, the use of wheel electronics packages for measurement of absolute tire pressures on only the first axle (front axle or steering axle) has the advantage that there is no longer a need for costly tire pressure sensors on the second and third axles. Otherwise, double tire pressure sensors would have to be mounted on the dual wheels or two tire inflation connections would have to be connected to one another in a complex arrangement of hoses, screw couplings and tee pieces.

Because of the absolute pressure measurement on the wheels of the first axle, the two other axles can be compared with one another with greater certainty. For the comparisons of diagonal sums, the pressure measurement on the first axle permits the assumption that at least two values are determined relative to the absolute pressure level, which would not be the case if only ABS wheel sensors were being used. Thus, cost-effective, reliable and accurate tire pressure monitoring is possible.

Figure 7:
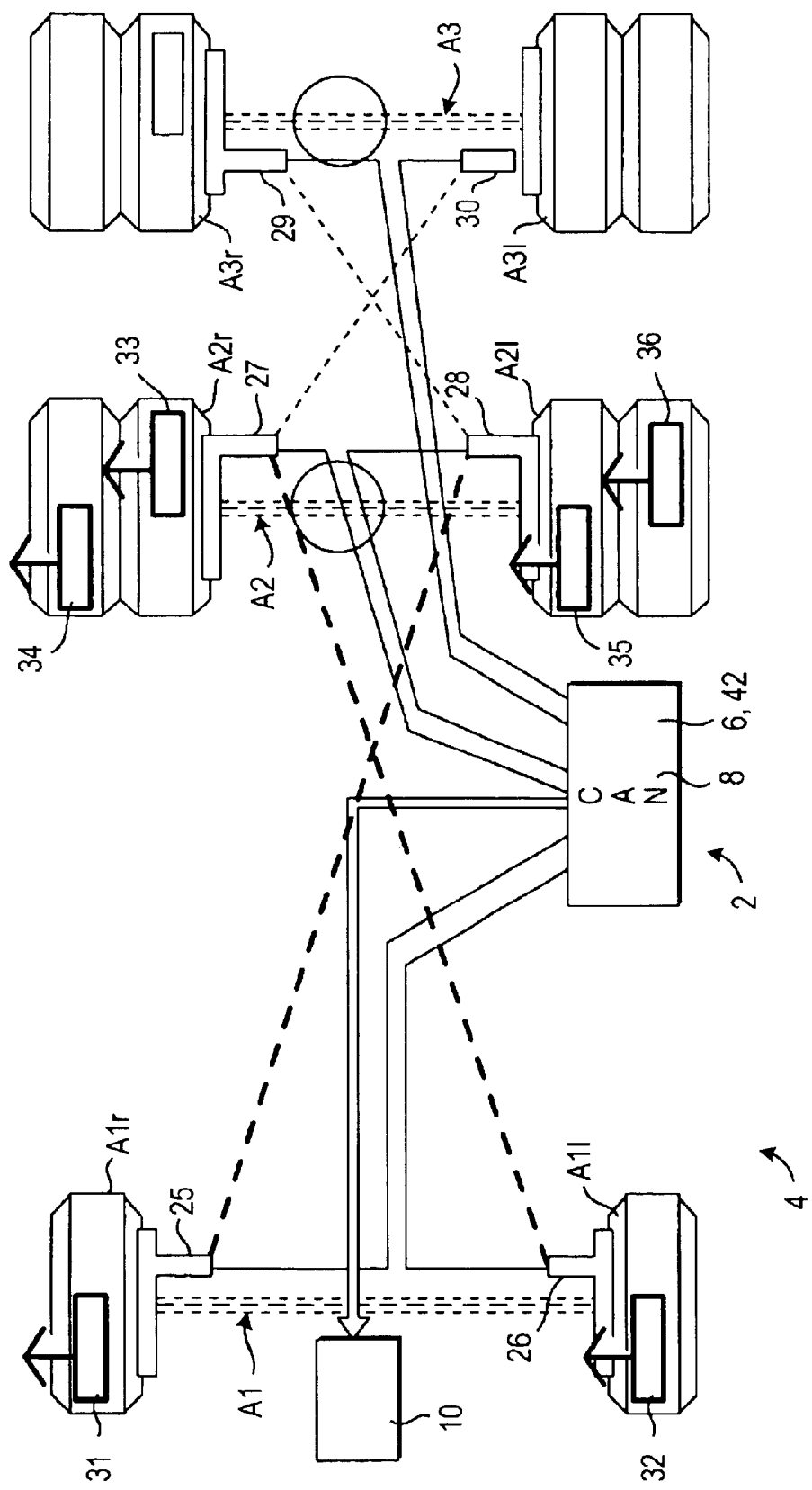
Figure 8:
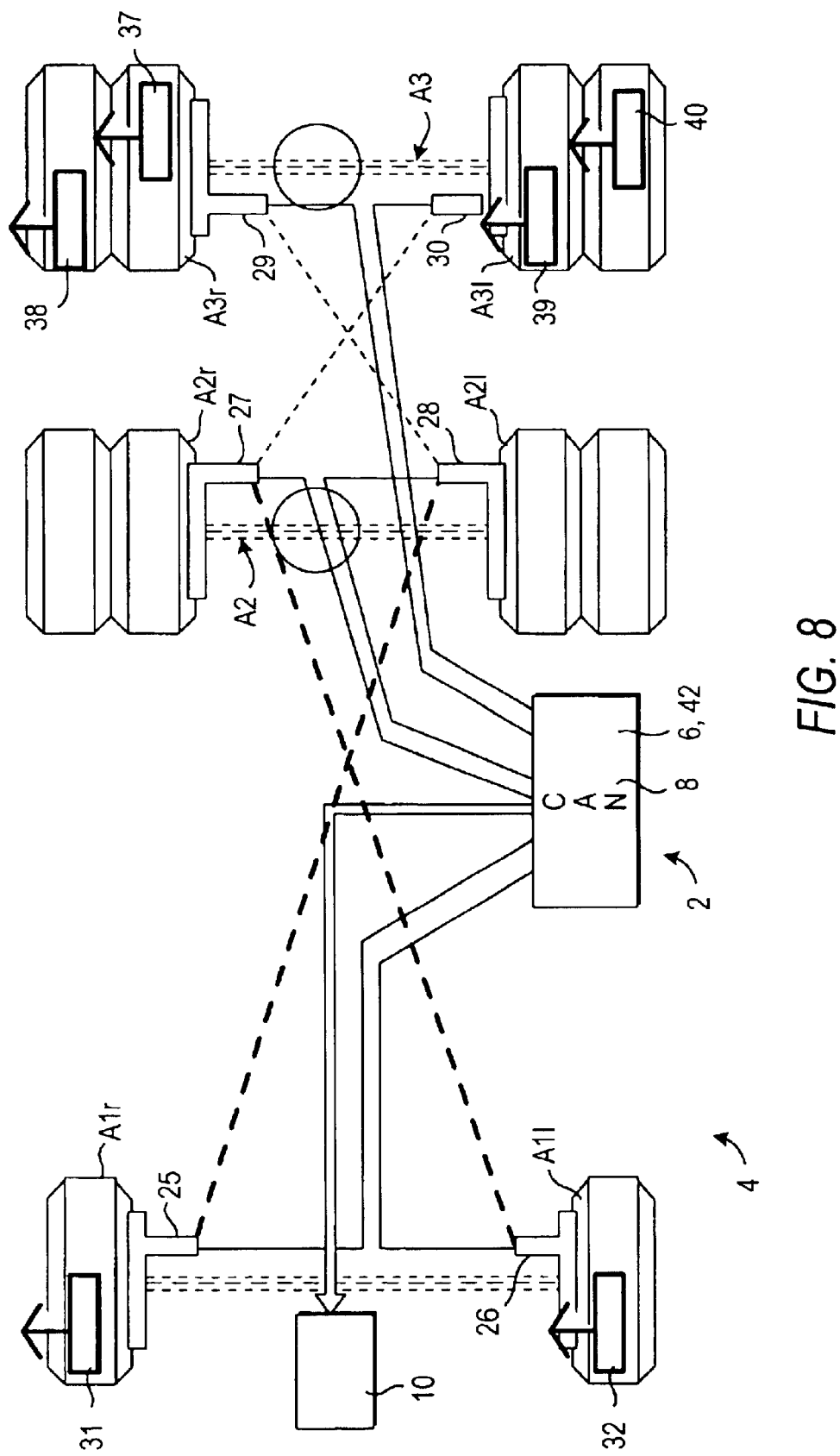

FIGS. 7 and 8 show embodiments of the present invention that differ from the embodiment depicted in FIG. 6 in that the absolute tire pressure is measured on two axles, specifically on the wheels of first axle A1 and on the wheels of second axle A2 (FIG. 7) as well as on the wheels of first axle A1 and on the wheels of third axle A3 (FIG. 8). While this arrangement may be more complex compared with the embodiment depicted in FIG. 6, greater support for the results from the diagonal comparisons is achieved.

Figure 9:
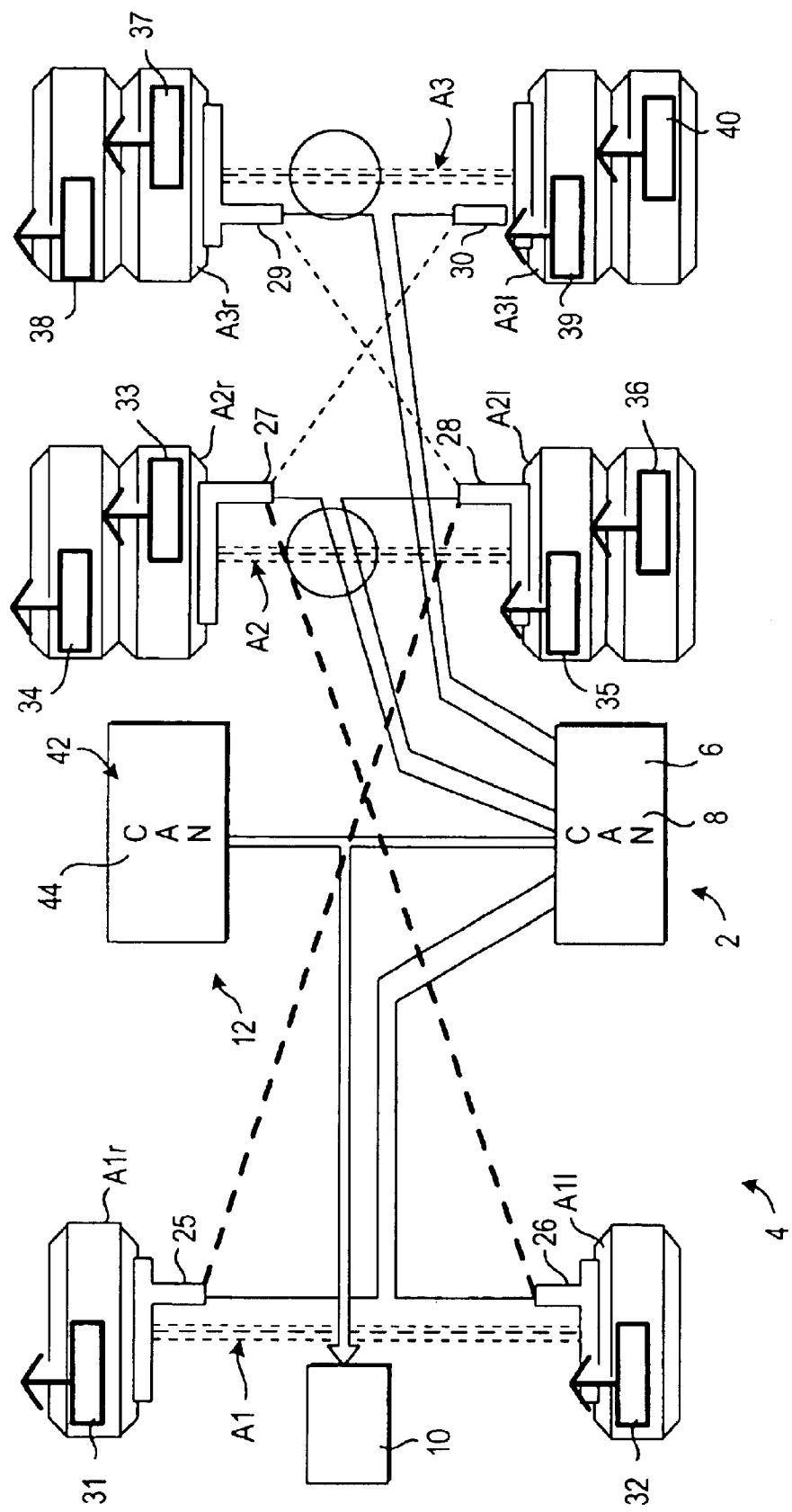

FIG. 9 shows an embodiment of the present invention that corresponds to the embodiment depicted in FIG. 1, with the exception that a comparison of diagonal sums is performed as in the embodiments shown in FIGS. 6, 7 and 8.

Figure 10:
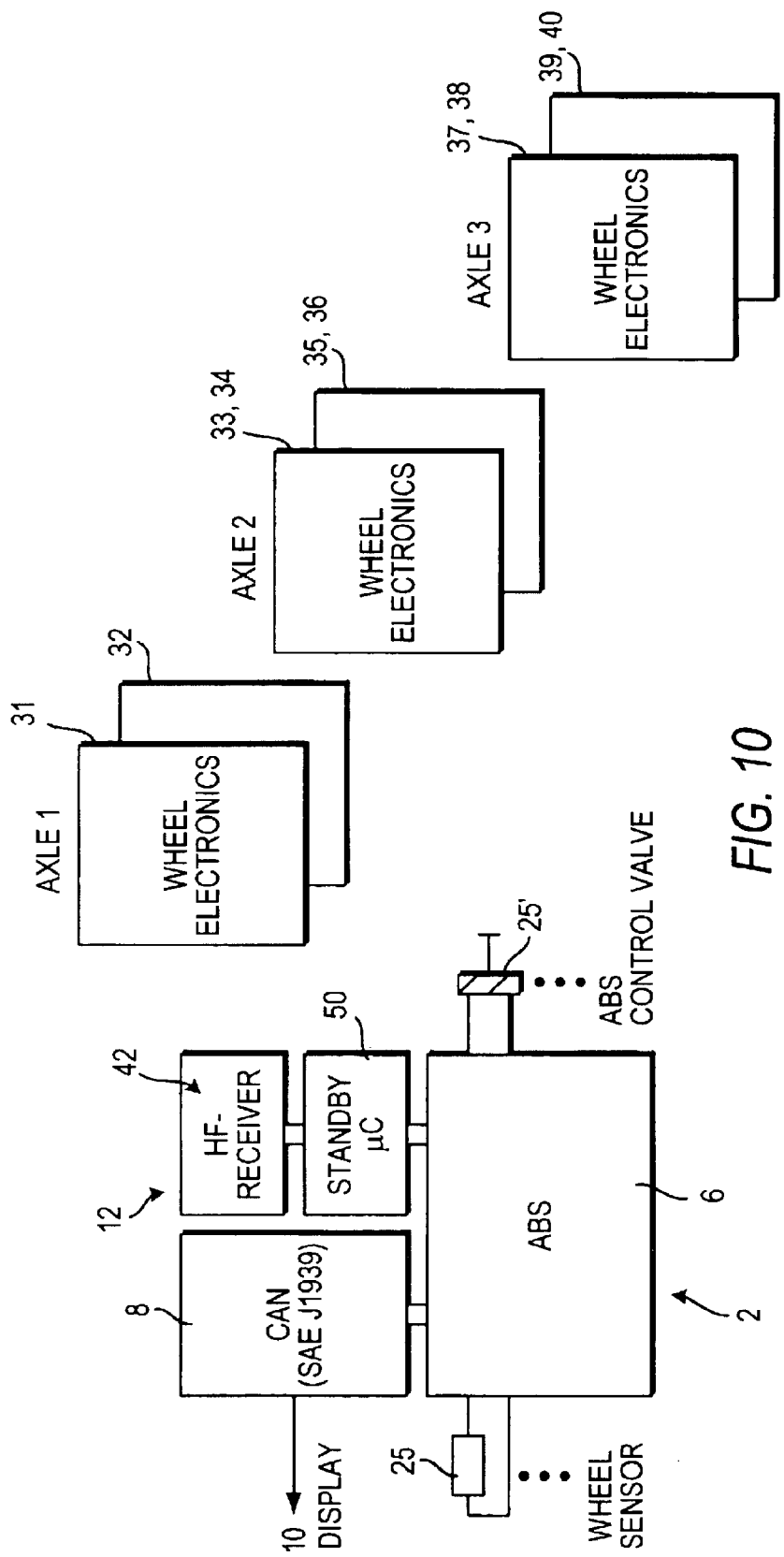
FIG. 10 is a block diagram of an ABS control device with integrated control unit of a tire pressure measuring system employed in the tire pressure monitoring system according to the present invention.

FIG. 10 shows the integration of receiver/evaluation device 42 of tire pressure measuring system 12 into ABS control unit 6 of ABS 2. ABS control unit 6, HF receiver 42 of tire pressure measuring system 12, a standby microcontroller 50 as well as a CAN interface 8 (such as, for example, SAE J1939) used jointly for both systems are disposed in a common housing. The standby microcontroller is constantly ready to receive the signals of the wheel electronics packages, even when the vehicle is parked, since the wheel electronics packages constantly transmit measured pressure values. This feature is provided in the embodiments of the inventive tire pressure monitoring device according to FIGS. 3 to 8. Reference symbols 25, 25' and 10 as well as 31 to 40 respectively denote an ABS wheel sensor, an ABS control valve, a display and wheel electronics packages of the tire pressure measuring system.

Figure 11:
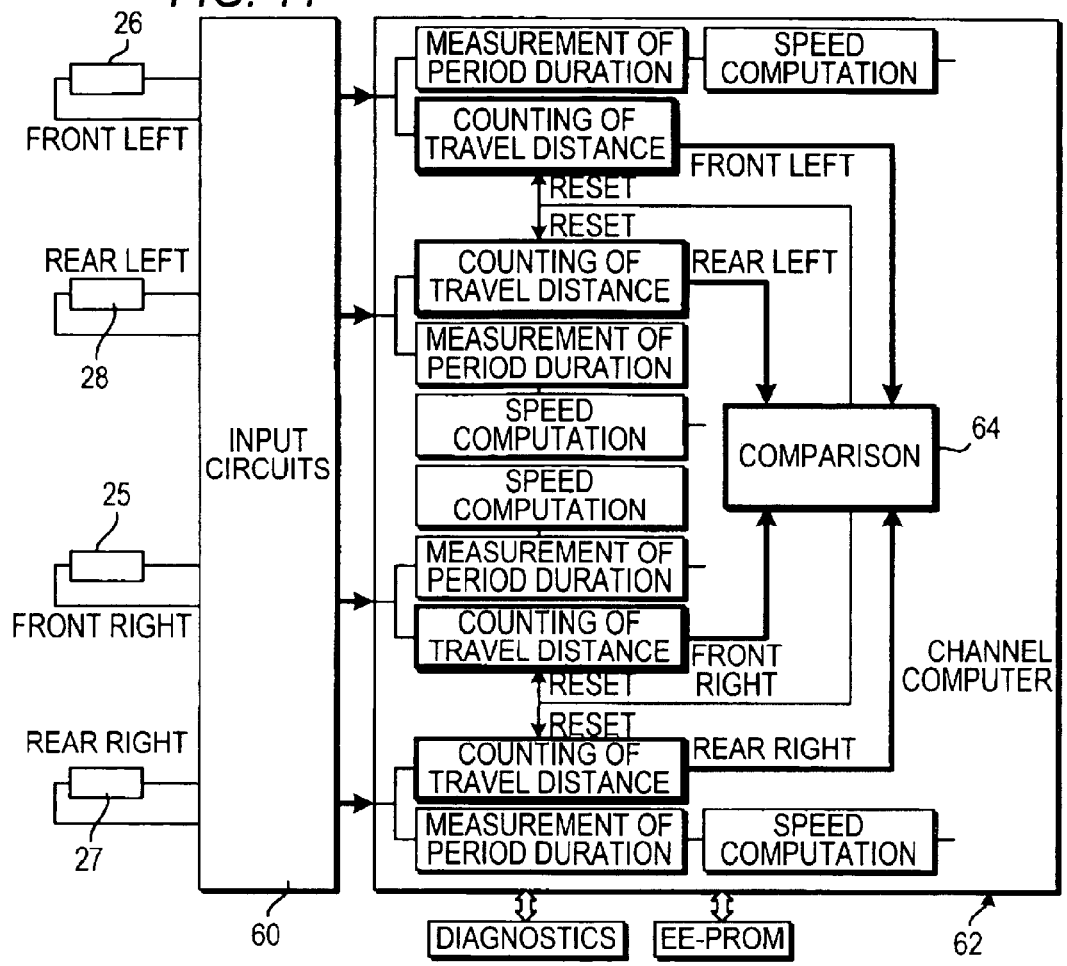
FIG. 11 is a block diagram of a device for determining travel distance according to the tire pressure monitoring system of the present invention.
Figure 12:
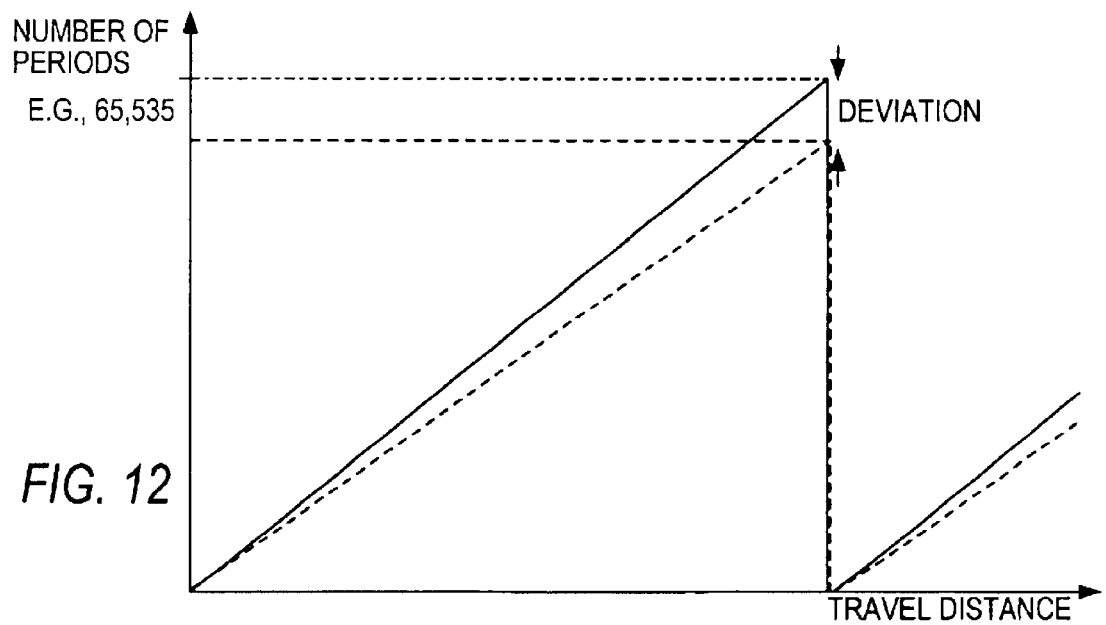
FIG. 12 is a graph showing the number of periods counted by a count register of the device shown in FIG. 11 plotted against travel distance, according to the present invention.

A device for determination of travel distance will be explained in more detail with reference to FIGS. 11 and 12. Voltages transmitted by wheel sensors 25, 26, 27, 28 are filtered by input circuits 60 and converted to square-wave signals, whose half-period or whole-period durations are evaluated by at least one microcontroller 62. While only one microcontroller is shown in the drawings, it should be understood that a plurality of microcontrollers can be used. The functions for the anti-lock braking system/acceleration-slip regulation (ABS/ASR) are labeled as "period-duration measurement" and "speed computation."

The present invention preferably provides a parallel-configured travel distance determination unit, which represents a count register whose value is incremented each time the sensor voltage passes through zero. Thus, the travel distance can be determined simply by counting the periods of the sensor signals.

If microcontroller 62 evaluates only whole periods or multiples thereof, the travel distance counter (count register) is incremented only upon each corresponding passage through zero. If the microcontroller is to choose between these possibilities as a function of speed, it is desirable to choose incrementation which corresponds to the multiple of one half period. The number of passages through zero depends on the tire rolling circumference and on the number of teeth of the pole wheel. The count values are assessed constantly by a comparator 64 or only upon overflow of the count register with the highest achieved count number.

For example, for a rolling circumference of 3,425 mm and a pole wheel with 100teeth, each passage through zero represents a travel distance of 17.125 mm. After a target travel distance of, for example, 1 km, the count values reached are compared with one another. As a digital measure, assessment of the achieved count values can be initiated when the count value leads to overflow of the count register. For 16-bit count registers, overflow takes place when the count value has been incremented to 65,535($2^{16}$−1). 65,535+1 is equal to zero, since the $17^{th}$ place of the binary number is not available (see FIG. 12). The count value of $2^{16}$=65,536corresponds to 1.122 km. This in turn corresponds to a resolution of 1/65536 or 0.0015%.

Wheel speed has been found to increase by about 0.5% per bar of pressure loss. This means that the period duration and thus the travel distance of a tooth decreases by about 0.5% per bar. Since 100 teeth represent the rolling circumference of the tire, this is also reduced by the cited percentage. The favorable resolution (measurement accuracy) indicated hereinabove in the present example is greater by a factor of 328 than the influence of pressure loss (per bar) that is measured.

The count results obtained are preferably weighted. As with computation of when the ASR threshold is exceeded, the difference between wheels on the same side is desirably given greater weight than that between wheels disposed on the same axle or on the same diagonal.

It should be appreciated that, by virtue of the counting of the respective travel distances covered using the ABS wheel sensors, only a few conversion steps are necessary—fewer than in prior art methods—and, as a result, greater computing accuracy can be achieved, especially through the use of computers. A smaller number of conversion steps has the advantage that rounding is applied less frequently and values to the right of the decimal point are disregarded less frequently in the computation.

The determination of travel distance can be paused or stopped and restarted, for example when a nonsteady driving situation is recognized, such as anti-lock braking, acceleration slip regulation, cornering or even driving at low speed.

The inventive device for determination of travel distance functions independently of speed. No further expense is necessary either to improve the speed computation or to filter the result drastically in order to eliminate transient fluctuations. There is no need to allow for measurement uncertainties, such as rounding errors in the speed computation. The travel distance covered by the wheel is determined directly, without the need for another computational variable. The determined travel distance forms an integral, and so fluctuations of individual period durations caused by roadway asperities, for example, have no influence.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for monitoring tire pressure in a vehicle having at least four wheels and wheel sensors, said method comprising the steps of sensing wheel sensor signal pulses associated with wheel rotation of each of said at least four wheels, determining travel distances covered by each of said at least four wheels by counting said wheel sensor signal pulses for each of said at least four wheels, summing said travel distances covered by each of said at least four wheels along diagonal groupings of said at least four wheels relative to the arrangement of said at least four wheels on said vehicle, comparing the sums of said travel distances for each diagonal grouping of said at least four wheel, and recognizing an insufficient tire pressure condition when said sums differ from one another by more than a preselected limit value.

2. The method according to claim 1, wherein the step of determining said travel distances covered by each of said at least four wheels is carried out in a plurality of monitoring cycles, and further comprising the step of recognizing an insufficient tire pressure condition when deviations of the sums of said travel distances for diagonal groupings of said at least four wheels exceed a preselected limit value for said monitoring cycles.

3. The method according to claim 1, wherein half waves of said wheel sensor signal pulses arc counted in said step of determining said travel distances covered by each of said at least four wheels.

4. The method according to claim 1, further comprising the steps of ascertaining whether the sums of said travel distances for each diagonal grouping of said at least four wheels have one of positive and negative and zero values, and determining the location of a wheel exhibiting an insufficient tire pressure based on whether said sums are one of positive and negative and zero.

5. A tire pressure monitoring system for a vehicle having a plurality of wheels, a plurality of axles for supporting said wheels, and an anti-lock braking system including a control unit, said monitoring system comprising wheel sensors on at least one of said wheels of at least one of said axles for sensing at least one of travel distances covered by said wheels and rotational speed of said wheels, said control unit adapted to evaluate said at least one of travel distances and rotational speed to account for change caused by driving operation, means for directly measuring tire inflation pressure of at least one of said wheels of at least one of said axles to corroborate said change caused by tire pressure decrease, and means for generating a warning signal when said change caused by tire pressure decrease exceeds a preselected limit value.

6. The tire pressure monitoring system according to claim 5, further comprising at least one microcontroller for receiving signals from said wheel sensors and counting periods of said signals to determine said travel distances covered by said wheels.

7. A tire pressure monitoring system for a vehicle having a plurality of wheels, a plurality of axles for supporting said wheels, and an anti-lock braking system including a control unit, said monitoring system comprising wheel sensors on at least one of said wheels of at least one of said axles for sensing attributes associated with wheel rotation, said control unit adapted to logically combine said attributes and to evaluate said attributes with respect to change of rolling radii of said wheels and to account for change of said attributes caused by driving operation, means for directly measuring tire inflation pressure of at least one of said wheels of at least one of said axles to corroborate said change of said attributes caused by tire pressure decrease, said tire inflation pressure measuring means including at least one wheel electronics package having a pressure sensor and an HF transmitter for transmitting said measured tire inflation pressure, a receiver/evaluation device for receiving said measured tire inflation pressure and comparing said tire inflation pressure with a preselected setpont pressure, and means for generating a warning signal when at least one of(i) said change of said attributes caused by tire pressure decrease exceeds a preselected limit value and (ii) the difference between said measured tire inflation pressure and setpoint pressure exceeds a preselected threshold value.

8. The tire pressure monitoring system according to claim 7 wherein said at least one wheel electronics package is disposed on at least one of said wheels.

9. The tire pressure monitoring system according to claim 7, wherein said at least one wheel electronics package is disposed on said vehicle.

10. The tire pressure monitoring system according to claim 7, wherein said wheel sensors and said at least one wheel electronics package are provided for each of said wheels of all of said axles.

11. The tire pressure monitoring system according to claim 7, wherein said receiver/evaluation device is integrated into said control unit.

12. The tire pressure monitoring system according to claim 7, further comprising a controller area network interface for controlling the transmission and reception of signals representing said measured tire inflation pressure.

13. The tire pressure monitoring system according to claim 7, further comprising a microcontroller for receiving signals representing said measured tire inflation pressure from said at least one wheel electronics package.

14. The tire pressure monitoring system according to claim 7, wherein said at least one wheel electronics package includes an identifier which is transmitted during transmission of said measured tire inflation pressure.

15. A tire pressure monitoring system for a vehicle having a plurality of wheel, first, second and third axles for supporting said wheels, and an anti-lock braking system including a control unit, said monitoring system comprising wheel sensors provided on said wheels of said first, second and third axles for sensing attributes associated with wheel rotation, said control unit adapted to logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said ales, said tire pressure measuring system including at least one wheel electronics package provided for said wheels of said first, second and third axles, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of (i) said change of said attributes caused by tire pressure decrease exceeds a preselected limit value and (ii) the difference between said tire inflation pressure and said setpoint pressure exceeds a preselected threshold value.

16. A tire pressure monitoring system for a vehicle having a plurality of wheels, first, second and third axles for supporting maid wheels, and an anti-lock braking system including a control unit, said monitoring system comprising wheel sensor provided on said wheels of said first and second axles for sensing attributes associated with wheel rotation, said control unit adapted to logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said axles, said tire pressure measuring system including at least one wheel electronics package provided for said wheels of said second and third axles, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of (i) said change of said attributes caused by tire pressure decrease exceeds a preselected limit value and (ii) the difference between said tire inflation pressure and said setpoint pressure exceeds a preselected threshold value.

17. A tire pressure monitoring system for a vehicle having a plurality of wheels, first, second and third axles for supporting said wheels, and an anti-lock braking system including a control unit, said monitoring system comprising wheel sensors provided on said wheels of said first and second axles for sensing attributes associated with wheel rotation, said control unit adapted to logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said axles, said tire pressure measuring system including at least one wheel electronics package provided for said wheels of said first and third axles, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of (i) said change of said attributes caused by tire pressure decrease exceed; a preselected limit value and (ii) the difference between said tire inflation pressure and said setpoint pressure exceeds a preselected Threshold value.

18. A tire pressure monitoring system for a vehicle having a plurality of wheels, first, second and third axles for supporting said wheels, and an anti-lock braking system including a control unit, said monitoring system comprising wheel sensors provided on said wheels of said first and second axles for sensing attributes associated with wheel rotation, said control unit adapted to logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said axles, said tire pressure measuring system including at least one wheel electronics package provided for said wheels of said third axle, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of (i) said change of said attributes caused by tire pressure decrease exceeds a preselected limit value and (ii) the difference between said tire inflation pressure and said setpoint pressure exceeds a preselected threshold value.

19. A tire pressure monitoring system for a vehicle having a plurality of wheels, first, second and third axles for supporting said wheels, and an anti-lock braking system including a control unit, said monitoring system comprising wheel sensors provided on said wheels of said first, second and third axles for sensing attributes associated with Wheel rotation, said control unit adapted to logically combine said attribute, and to evaluate said attributes with respect to change of rolling radii of said wheels and to account for change of said attributes caused by driving operation, a tire pressure measuring system for measuring the tire inflation pressure of at least one of said wheels of at leant one of said axles, said tire pressure measuring system including at least one wheel electronics package provided for said wheels of said first axle, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of(i) said change of said attributes caused by tire pressure decrease exceeds a preselected limit value and (ii) the difference between said tire inflation pressure and said setpoint pressure exceeds a preselected threshold value.

20. A tire pressure monitoring system for a vehicle having a plurality of wheels, first, second and third axles for supporting said wheels, and an anti-lock braking system including a control unit, said monitoring system comprising wheel sensors provided on said wheels of said first, second and third axles for sensing attributes associated with wheel rotation, said control unit adapted to logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said axles, said tire pressure measuring system including at least one wheel electronics package provided for said wheels of said first and second axles, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of(i) said change of said attributes caused by tire pressure decrease exceeds a preselected limit value and (ii) the difference between said tire inflation pressure and said setpoint pressure exceeds a preselected threshold value.

21. A tire pressure monitoring system for a vehicle having a plurality of wheel, first, second and third axles for supporting said wheels, and an anti-lock braking system including a control unit, said monitoring system comprising wheel sensors provided on said wheels of said first, second and third axles for sensing attributes associated with wheel rotation, said control unit adapted to logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said ales, said tire pressure measuring system including at least one wheel electronics package provided for said wheels of said first,and third axles, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of (i) said change of said attributes caused by tire pressure decrease exceeds a preselected limit value and (ii) the difference between said tire inflation pressure and said setpoint pressure exceeds a preselected threshold value.

22. A tire pressure monitoring system for a vehicle having second and third axles, dual sets of tires on each of said second and third axles, and an anti-lock braking system including a control unit, said monitoring system comprising wheel sensors provided on said wheels of said second and third axles for sensing attributes associated with wheel rotation, said control unit adapted logically combine said attributes and to evaluate said attributes with respect to change of rolling radii of said wheels and to account for change of said attributes caused by driving operation, a tire pressure measuring system for measuring the tire inflation pressure of at least one of said wheels of at least one of said second and third axles, said tire pressure measuring system including at least one wheel electronics package provided for all of said dual sets of tires, said at least one wheel electronics package having a pressure sensor and a transmitter for transmitting said measured tire inflation pressure, a receiver/evaluation device for receiving said measured tire inflation pressure and comparing said tire inflation pressure with a preselected setpoint pressure, and means for generating a warning signal when at least one of (i) said change of said attributes caused by tire pressure decrease exceeds a preselected limit value and (ii) the difference between said tire inflation pressure and said setpoint pressure exceeds a preselected threshold value.

23. A method for monitoring tire pressure in a vehicle having a plurality of wheels, a plurality of axles for supporting said wheels, and an anti-lock braking system including a control unit and wheel sensors, said method comprising the stops of sensing wheel sensor signal pulses associated with wheel rotation of each of said wheels and counting said wheel sensor signal pulses for each of said wheels to determine travel distance covered by each of said wheels, summing said travel distances along diagonal groupings of said wheels relative to the arrangement of said wheels on said vehicle, comparing the sums of said travel distances for each diagonal grouping of said wheel, measuring the tire inflation pressure of at least one of said wheels of at least one of said axles utilizing a tire pressure measuring apparatus, comparing said tire inflation pressure with a preselected setpoint pressure, recognizing an insufficient tire pressure condition and generating a warning signal when at least one of (i) said sums differ from one another by more than a preselected limit value and (ii) the difference between said tire inflation pressure and said setpoint pressure exceeds a preselected threshold value.

24. The method according to claim 23, further comprising the step of ascertaining whether the sums of said travel distances for each diagonal grouping of said wheels have one of positive and negative and zero values, and determining the location of a wheel exhibiting an insufficient tire pressure based on whether said sums yield one of positive and negative and zero values.

25. The method according to claim 23, wherein the steps of sensing wheel sensor signal pulses associated with wheel rotation of each of said wheels and counting said wheel sensor signal pulses for each of said wheels to determine travel distance covered by each of said wheels is carried out in a plurality of monitoring cycles, and further comprising the step of recognizing an insufficient tire pressure condition when deviations of the sums of said travel distances for diagonal groupings of said wheels exceed a preselected limit for said monitoring cycles.

26. The method according to claim 23, wherein half waves of said wheel sensor signal pulses are counted in said step of counting said wheel sensor signal pulses for each of said wheels.

* * * * *